No. 880,899. PATENTED MAR. 3, 1908.
W. LUXMORE.
DENTAL ARTICULATOR.
APPLICATION FILED DEC. 19, 1906.

WITNESSES:

INVENTOR
William Luxmore
BY Frederick Benjamin
ATTY.

UNITED STATES PATENT OFFICE.

WILLIAM LUXMORE, OF CHICAGO, ILLINOIS.

DENTAL ARTICULATOR.

No. 880,899.

Specification of Letters Patent.

Patented March 3, 1908.

Application filed December 19, 1906. Serial No. 348,633.

*To all whom it may concern:*

Be it known that I, WILLIAM LUXMORE, citizen of the United States, residing at Chicago, in the county of Cook and State of Illinois, have invented certain new and useful Improvements in Dental Articulators, of which the following is a specification.

This invention relates to improvements in devices used by dentists in the manufacture of bridge-work and especially to that form of devices designated as articulators by the dental profession.

The especial object of the improvements which form the subject matter of this application, is to provide a device in which the operations of investing and soldering in what is known as "bridge work" can be quickly and accurately performed with the greatest convenience to the operator. In carrying out these especial objects and others of general utility, I have invented the apparatus shown in preferred form in the accompanying drawing, and hereinafter described in detail.

Figure 1:
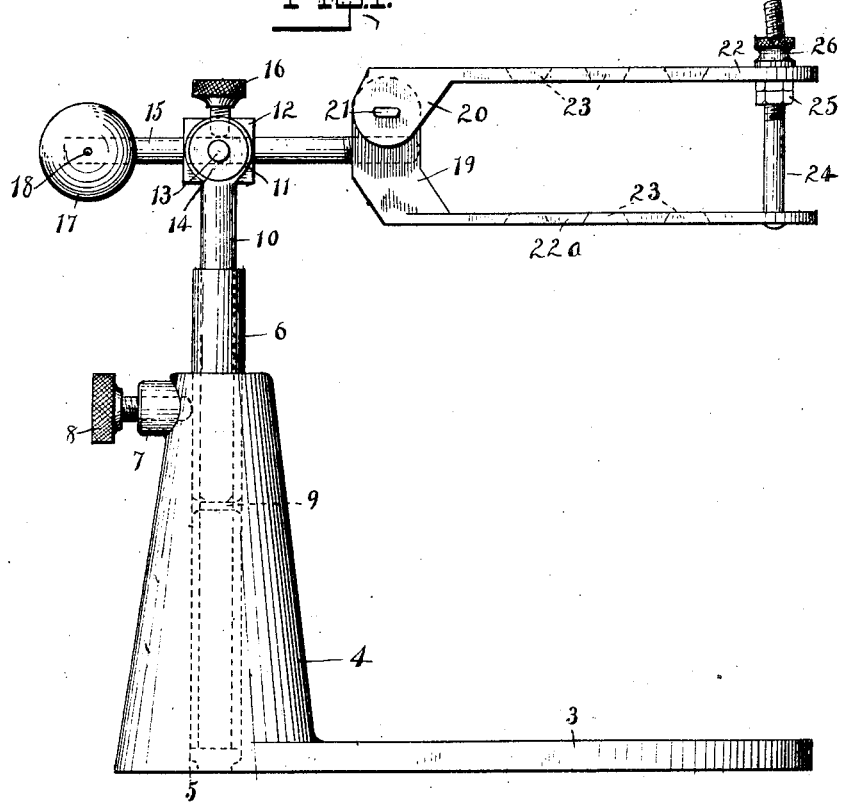
Figure 2:
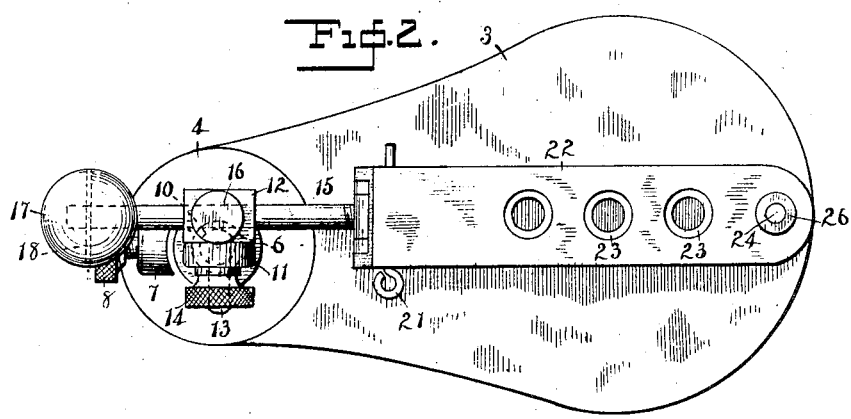

In the said drawing:—Figure 1 is a side elevation of a device constructed according to my invention, and Fig. 2 is a top plan view of the same.

Referring to the details of the drawing, 3 and 4 represent respectively the horizontal and vertical portions of a stand which furnishes the support for the operative parts of the apparatus. The part 3 is of sufficient size to counterbalance the upper part of the apparatus to receive a suitable burner and afford a firm base for the conical pedestal 4 which is preferably cast integral with the base. 7 represents a boss near the upper end of the pedestal which is suitably tapped to receive a thumb screw 8, the inner end of which frictionally engages the walls of a tube 6 which is slidably mounted in the bore of the pedestal. This tube has extending transversely thereof a pin 9 which serves as a stop for the rod 10 which is rotatably mounted in the tube 6. The rod 10 is formed with a head 11 which is bored to receive the stud bolt 13 having a head 12 on the rear side as shown in the drawing. The head 12 is transversely bored to receive slidably and rotatably the horizontal rod 15. The head 12 is tapped to receive the thumb screw 16 the inner end of which enters the bore in which the rod 15 is mounted so that by proper adjustment of the thumb screw 16, the rod 15 may be held in its adjusted positions or released as may be desired. On the bolt 13 is mounted a nut 14 which impinges frictionally on the head 11 when tightened.

Secured to the outer end of the rod 15 by a pin 18 is a ball 17 which serves as a suitable grasping piece for the rod in adjusting the latter. On the opposite end of the rod 15 is the articulator proper, composed of the following elements: A lower jaw having a shoulder 19 which is tapped to receive the threaded end of the rod 15, and is formed with a flattened portion 22ª in which a series of countersunk openings 23 are formed to receive the investing plaster. Pivotally mounted on the shoulder 19 by a removable pin 21 is the upper jaw of the articulator, formed with the shoulder 20, and the flattened portion 22 having countersunk openings 23 formed therein. Fixed in the outer end of the lower jaw 22ª is a threaded post 24 which passes through a suitable opening in the corresponding end of the upper jaw and has mounted thereon adjusting and locking nuts 26 and 25 respectively. The threaded portion of the post 24 is slightly curved with a radius from 21 to accommodate the movements of the upper jaw on its pivotal axis.

In a device constructed substantially as described, the operator will proceed with his investing operations in the usual manner except that he will not be obliged to remove the case from the articulator proper at any time between the waxing up of the teeth and the soldering. The case can be readily removed by opening up the upper jaw, and the burner is placed on the base 3 while the case remains in the articulator during the soldering operations. The upper jaw being adjusted and being locked in its adjusted positions, enables the operator to get his case absolutely accurate and without the possibility of variance between the finishing operations and the initial operations on the bridge work. The fact that the articulator is rotatably mounted on the axis represented by the rod 10 permits the operator to move the case over the frame and away from it at will, so that the hand work can be done without danger of burning the operator and without necessity for removing the burner. The longitudinal adjustment of the articulator by sliding the rod 15, enables the operator to bring the work at the desired point over the flame and when so adjusted, it will be maintained in that position by simply tightening the screw 16. The articulator being rotatable in its axis represented by the rod 15, permits the application of the flame to any surface of the case at will.

It will be apparent that in a device constructed as described the parts can be readily detached from each other thus permitting packing in a small space.

Having thus described my invention what I claim as new, is:—

1. In a device of the character stated, a supporting stand comprising a pedestal and a base, a tube vertically adjustable in said pedestal, a vertical rod rotatably mounted in said tube, a horizontal rod adjustably mounted in said vertical rod, and articulating jaws secured to said horizontal rod.

2. In a device of the character stated, a supporting stand comprising a pedestal and a base, a tube vertically adjustable in said pedestal, a vertical rod rotatably mounted in said tube, a horizontal rod pivotally and slidably mounted on said vertical rod, an articulating jaw fixed on said horizontal rod and a second jaw hingedly arranged relative to said fixed jaw.

3. In a device of the character stated, a supporting stand, articulating members comprising a fixed jaw, and a jaw pivotally mounted on the fixed jaw, means for locking said jaws in a predetermined relation, and means adjustably connecting said articulating members with said stand.

4. In a device of the character stated, a supporting stand, articulating members comprising a fixed jaw, and a jaw hingedly connected with the fixed jaw, means for adjusting said hinged jaw, and for locking it in its adjusted positions, a rod supporting said jaws and provided with a suitable grasping portion, means for adjustably connecting said rod with said stand.

5. In a dental articulator, an upper and a lower jaw adapted respectively to support the upper and lower jaws of a "case," the upper jaw hingedly connected with the lower jaw, means for adjusting said hinged jaw and for locking it in its adjusted position, and means supporting said jaws whereby they will be simultaneously adjusted.

6. In a dental articulator, a fixed jaw and a jaw hingedly connected at one end with said fixed jaw, means for readily disconnecting said jaws, and means for adjusting the hinged jaw relative to the fixed jaw and for locking it in its adjusted position.

7. In a dental articulator, a fixed lower jaw and an upper jaw hingedly connected at one end with said fixed jaw, means for adjusting the hinged jaw relative to the fixed jaw, and means for supporting said jaws, said means adapted to permit the jaws to be rotated about a horizontal axis and a vertical axis.

In testimony whereof I affix my signature in presence of two witnesses.

WILLIAM LUXMORE.

Witnesses:
FRANK R. TOWLE,
F. BENJAMIN.